United States Patent [19]

Massa

[11] 4,305,140

[45] Dec. 8, 1981

[54] LOW FREQUENCY SONAR SYSTEMS

[75] Inventor: Frank Massa, Cohasset, Mass.

[73] Assignee: The Stoneleigh Trust, Cohasset, Mass. ; Fred M. Dellorfano and Donald P. Massa, Trustees

[21] Appl. No.: 188,737

[22] Filed: Sep. 19, 1980

Related U.S. Application Data

[63] Continuation-in-part of Ser. No. 104,278, Dec. 17, 1979.

[51] Int. Cl.³ .......................... G01S 15/06; H04R 1/44
[52] U.S. Cl. ...................................... 367/99; 367/106; 367/155; 367/158
[58] Field of Search ................. 367/106, 99, 103, 142, 367/153, 154, 155, 158, 165, 166

[56] References Cited

U.S. PATENT DOCUMENTS 3,474,403  10/1969  Massa et al. ..................... 367/158
4,198,705   4/1980  Massa ............................... 367/126

*Primary Examiner*—Richard A. Farley

[57] ABSTRACT

A lightweight high-power transducer employs an axial array of dual-piston transducer element assemblies which are held in concentric alignment within a rigid cylindrical tube by O-rings set into grooves provided in the periphery of the pistons. The pistons have convex shaped vibratile surfaces which, in combination with the sound transmitting fluid which fills the tubular housing, causes each piston to be effectively radiating into an annular shaped tapered horn whose expanding peripheral annular area terminates into a peripheral opening placed in the circumference of the tubular housing. The combination of the inventive transducer with a tricardioid hydrophone results in a lightweight portable sonar system which achieves long-range target detection with a bearing resolution of 5°.

22 Claims, 4 Drawing Figures

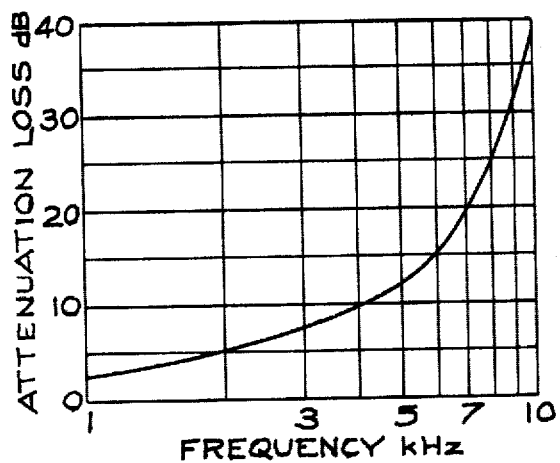
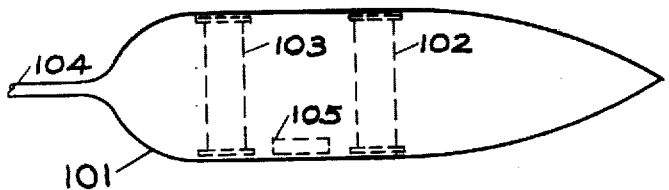
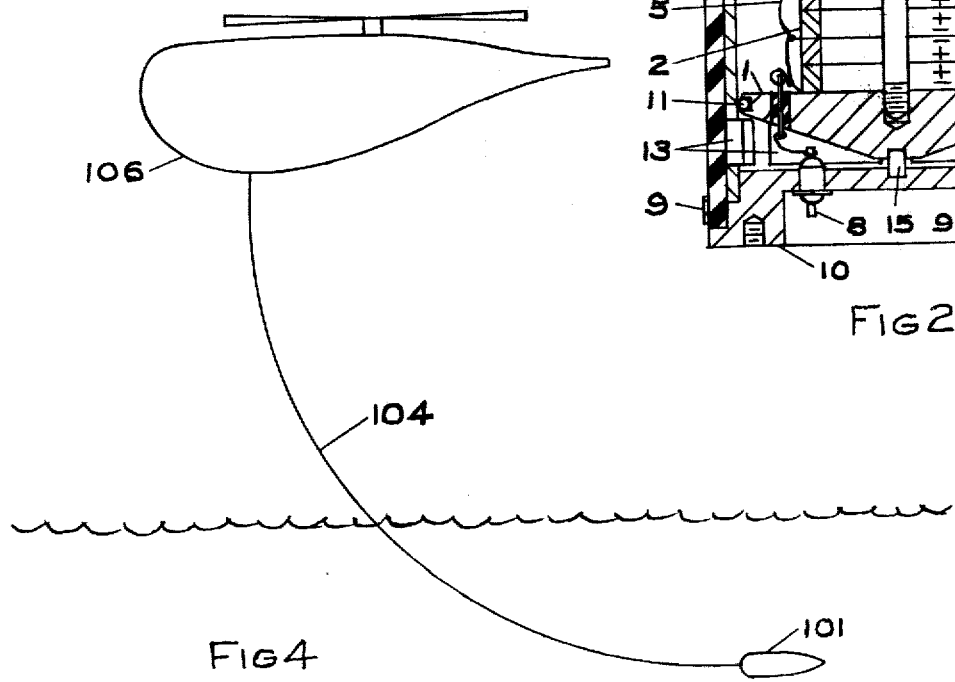
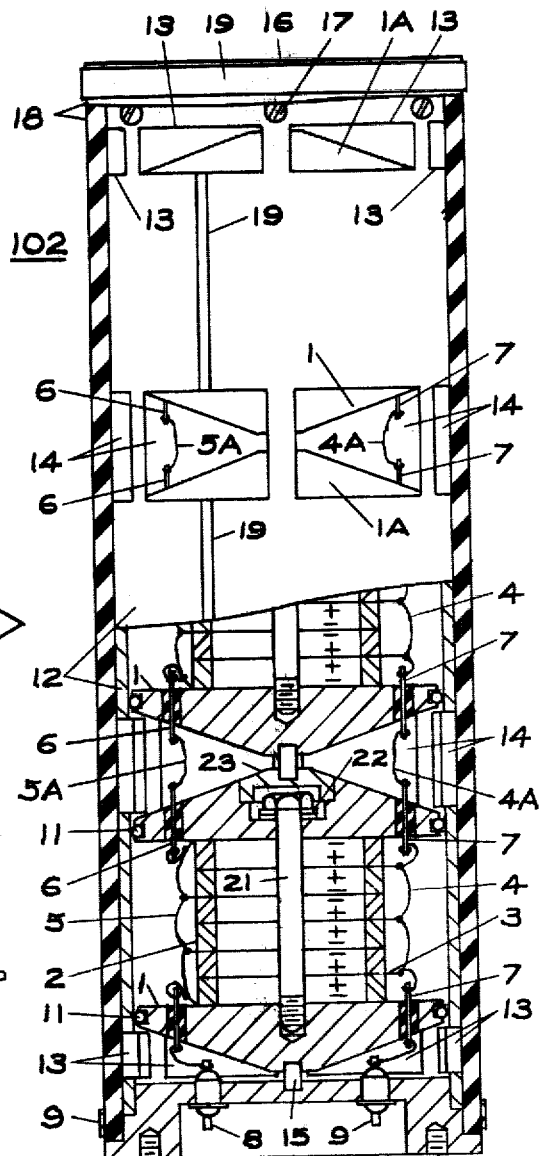
FIG1
FIG3
FIG2
FIG4

LOW FREQUENCY SONAR SYSTEMS

The invention is a continuation-in-part of my co-pending application Ser. No. 104,278, filed Dec. 17, 1979, entitled "Low Frequency Directional Sonar Systems."

This invention is concerned with improvements in sonar systems and particularly with the reduction in the weight, size and cost of a sonar system that will locate underwater targets at relatively long range in the order of 20,000 meters.

The present invention discloses the design of an improved lightweight transducer for operating at efficiencies in excess of 50% in the mid-audio frequency region in the general vicinity of 3 or 4 kHz, more or less. The new transducer is combined with the tricardioid hydrophone described in my copending application to produce several novel sonar systems that may be used by small craft to achieve long-range target detection comparable to the target ranges obtained with conventional scanning sonar systems 10 to 20 times larger and weighing 20 to 50 times more.

In order to reduce the size and weight of conventional scanning sonar systems in present use, it is necessary to increase the frequency of operation which in turn drastically reduces the range of detection. For example, at a target range of 20,000 meters, the relative increase in attenuation loss sustained by a transmitted sonar signal of 10 kHz in travelling the round-trip distance to the target is approximately 30 dB greater than the loss sustained by a sonar signal operating in the frequency region 3 to 4 kHz. In order to overcome the enormous target range disadvantage associated with the use of high audio frequencies, there has been a continual decrease in the frequency of operation of sonar systems. During the period of World War II, most all sonar systems operated at ultrasonic frequencies and the associated disadvantage of limited sonar detection range was soon recognized. Following World War II, there has been a continuing effort throughout the world in improving the target detection range of sonar systems by progressively lowering their operating frequencies from the upper audible range down to the mid-audio frequency region. Although improved target range has been achieved with the use of lower frequency sonar systems, it is impractical to make general use of them, except in limited applications, because their immense size and weight require the use of large ships for their installation. This invention overcomes these very serious limitations associated with conventional low-frequency scanning sonar systems and provides a low-frequency sonar system that incorporates all the advantages associated with the use of the lower frequencies without the disadvantages associated with the enormous weight, size and cost of the present low-frequency scanning sonars.

My co-pending application discusses background details relating to sonar development during the past 3 or 4 decades and indicates the necessity for reducing sonar operating frequencies in order to achieve long-range detection. The co-pending application also discusses the use of my new tricardioid hydrophone, which is only a few inches in diameter and weighs less than 50 lbs., to achieve a target bearing resolution of 5° which, for a conventional scanning sonar system operating in the mid-audible frequency range, requires the use of a transducer several meters in diameter and weighing many tons. The background information and the description and advantages of the new tricardioid hydrophone are fully discussed in the co-pending application and will not be repeated in this application. The specification filed in the co-pending application is incorporated in this application by reference.

The primary object of this invention is to design an improved sonar transducer for high-power, high-efficiency operation in the mid-audio frequency region and whose weight and size are an order to magnitude less than contemporary scanning sonar transducers used in present day sonar systems operating in the same frequency region.

Another object of this invention is to combine the inventive transducer with a tricardioid hydrophone to create a lightweight echo-ranging sonar system capable of operating in the mid-audio frequency region with transmitter power levels in the order of 10 kW or more and achieve a target bearing resolution of 5° with a transducer size in the order of ½ wavelength diameter at the operating frequency.

Still another object of this invention is to achieve high performance sonar operating characteristics with a structure which is a very small fraction of the size and weight of conventional scanning sonar systems thereby making it possible for the inventive lightweight sonar system to be used on small naval craft.

Another object of the invention is to combine the small inventive transducer and tricardioid combination into a configuration that permits its permanent installation on any submarine, without the necessity of special submarine construction, by simply mounting the small structures directly on a top or bottom surface of the vessel.

An additional object of this invention is to mount the inventive lightweight transducer in combination with the tricardioid hydrophone within a small streamlined fish, that can be easily towed by a small boat or helicopter at an advantageous water depth removed from the proximity of ship's noise and thereby add enormously to the effectiveness of sonar surveillance over present state-of-the-art portable or expendable surveillance systems.

These and other objects of the invention will become evident in the following detailed description. The novel features which are characteristic of the invention are set forth with particularity in the appended claims. The invention itself, however, both as to its organization and method of operation, as well as advantages thereof, will best be understood from the following description of several embodiments thereof when read in connection with the accompanying drawings, in which:

FIG. 1 is a graph showing the attenuation loss as a function of frequency due to absorption in seawater for a sonar signal which has travelled a round-trip distance to a target located at a range of 20,000 meters.

FIG. 2 is a vertical partial cut-away and partial cross-sectional view illustrating the construction of one preferred embodiment of the inventive transducer.

FIG. 3 is a schematic illustration showing the combination of the inventive transducer with a tricardioid hydrophone within a streamlined fish to achieve a lightweight portable towed sonar system that can be used for improved long-range sonar surveillance from small patrol vessels.

FIG. 4 illustrates the inventive lightweight portable sonar system shown in FIG. 3 being towed by a helicopter and being used as a towed sonar surveillance system.

Referring more particularly to the figures, FIG. 1 is a graph showing the average measured round-trip attenuation loss sustained by a sonar signal due to absorption in seawater as a function of frequency for a target range of 20,000 meters. The curve shows the rapid increase in attenuation loss for frequencies exceeding the approximate region 3 kHz to 4 kHz. The attenuation loss for 3.5 kHz is shown as approximately 8 dB. For a sonar frequency of 10 kHz, the attenuation loss increases very rapidly to 38 dB. Thus, to obtain the same target range as can be obtained with a few kilowatts of acoustic power at 3.5 kHz will require a few megawatts of acoustic power at 10 kHz, which is obviously a practical impossibility of achievement. It is, therefore, evident why it is advantageous to use sonar frequencies in the mid-audible frequency region in the general neighborhood of 3 or 4 kHz, more or less, to achieve improved long-range target detection.

Conventional scanning sonar transducers in present use that operate in the frequency region between 3 kHz to 6 kHz are approximately 6 to 12 ft. diameter and weigh many tons. Sonar transducers for use near the lower end of the frequency region in the neighborhood of 3 kHz are of such enormous size that only the very largest ships can accomodate their installation.

The inventive sonar system which makes use of the new lightweight transducer illustrated in FIG. 2, in combination with the tricardioid receiving hydrophone array described in my co-pending application, provides a lightweight surveillance sonar system for operating in the 3 kHz to 4 kHz region with all the advantages herein described and further described in my co-pending application.

FIG. 2 is a partial cut-away and partial cross-sectional schematic view of one illustrative embodiment of the inventive transducer design. In this preferred embodiment three identical transducer element assemblies are mounted coaxially within a rigid tubular housing 12 as illustrated. Each element assembly preferably comprises two conically shaped aluminum pistons 1 and 1A bonded with a suitable cement such as epoxy to the opposite parallel ends of an electromechanical force generator comprising a plurality of lead-zirconatetitanate rings 2. Thin conducting electrode washers 3 are cemented with electrically conductive epoxy or other suitable conductive adhesive between each pair of ceramic rings 2 to establish electrical connection to the face-to-face common potential surfaces of the ceramic rings as illustrated. Projecting tabs from the outer periphery of the electrode washers 3, which are located between the positive polarity surfaces of the ceramic rings 2, are connected together with the conductors 4. The conductors 5 make similar connection to the negative polarity surfaces of the ceramic rings as illustrated in FIG. 2. The three dual-piston transducer element assemblies are connected together electrically with conductors 4A and 5A soldered to the insulated terminals 6 and 7 which are provided through each of the piston surfaces as shown. The external transducer connections appear across the insulated terminals 8 and 9 provided in the recessed cavity of the flange member 10 as shown.

Each piston includes an O-ring 11 set into a groove provided in the periphery of the piston as shown in FIG. 2. The O-rings act as spacers to keep the pistons in concentric alignment within the rigid cylindrical tube 12. The tube 12 is provided with a plurality of openings 13 through its peripheral wall to form a circumferential perforated area at each end of the transducer assembly as illustrated in FIG. 2. Similar peripheral openings 14, which are approximately twice the area of the openings 13, are placed through the peripheral wall of the tube 12 in the region of the junctions of the two facing conical pistons which are located approximately ⅓ the distance from each end of the tube 12 as shown. A resilient support member 15 is inserted into an axial recess provided in the tip of each piston to serve as resilient supports for holding the transducer element assemblies in a vertical spaced relationship as illustrated. An axial recess is also provided in the face of flange member 10 to receive the lower resilient support member 15 (shown in FIG. 2) and in the face of the base member 16 to receive the upper resilient support member (not visible in FIG. 2). The tube 12 is fastened to the outer periphery of the flange member 10 and base member 16 by suitable fasteners such as screws 17. A rubber boot 18 is then sealed to the periphery of the flange 10 and the periphery of the base 16 using the metal bands 19 in the conventional manner well known in the art. The inside surface of the rubber boot 18 may be spaced from the outside surface of the rigid cylinder 12 to permit the passage of oil through all of the perforated areas 13 and 14 when the assembly is oil filled, or alternately, a shallow longitudinal groove 19 may be machined along the outer surface of the tube 12 as shown in order to provide easier passage for the oil filling from one end of the transducer assembly to reach throughout the transducer structure. After completing the mechanical assembly, the structure is evacuated and then oil filled through a suitable filling hole (not shown) in the conventional manner well known in the art and the filling hole is then sealed with a pipe plug (not shown) as is also well known in the art. During the evacuation of the transducer a vacuum is also preferably applied to the outer surface of the rubber boot to prevent the boot from collapsing into the perforated openings 13 and 14 during evacuation. The method for oil filling and the use of an external vacuum is also well known to anyone skilled in the art of sonar transducer design. After completing the oil filling, a waterproof cable (not shown) is connected to the terminals 8 and 9. The cable is sealed through an opening in the surface of a plate (not shown) which is bolted to the tapped holes 20 to complete the transducer assembly.

The axial array of the three dual-piston transducer element assemblies as illustrated in FIG. 2 is capable of operating at 60% efficiency and will transmit tone bursts in the 3.5 kHz region in an omnidirectional pattern in the horizontal plane with a source level of approximately 115 dB vs. 1 microbar at 1 meter. A six element array, which would be twice the length of the three element array described, will generate a source level in excess of 120 dB. A special advantage of the three element array illustrated in FIG. 1 is that the array provides four equally spaced annular sources of sound in which the intensity of the two center sources is double the intensity of the two end sources. If the axial separation between the four sources of sound is made approximately one-half wavelength at the operating frequency, the beam pattern of the radiated sound will concentrate most of the energy in the horizontal plane and the secondary lobes in the radiation pattern will be reduced because of the 1-2-2-1 intensity shading which results from the construction illustrated in FIG. 2, thereby minimizing the radiation of sound outside the region of the main beam.

For high power operation of the transducer, it is desirable to use a stress bolt 21 as illustrated to apply a compressive mechanical bias stress to the ceramic rings. It is also advantageous to use Belleville springs 22 to maintain a constant bias stress independent of water temperature. The use of a stress bolt and Belleville springs for improving the reliability and high power performance of the transducer is well known and is fully described in U.S. Pat. No. 3,328,751 dated June 27, 1967. An auxiliary plug 23 is cemented with epoxy to fill the counterbored cavity in the tip of the piston 1A to restore the conical contour of the piston surface after the bolt 21 is assembled in the structure.

In order to obtain transducer efficiencies in excess of 50% and also to achieve a relatively low Q below 5 or 6, I have found it preferable to use a low density material such as aluminum for the pistons and to employ piston diameters that are within the approximate range $\frac{1}{4}$ to $\frac{5}{8}$ of a wavelength at the operating frequency. I have also found it advantageous to use a convex shape for the outer vibratile surfaces of the vibrating pistons. For better achieving the desired objectives, I have found it desirable to make the convex piston surface conical in shape as shown in FIG. 2. It is also advantageous to make the area of each circumferential row of openings 13 approximately equal to the projected area of the circular piston 1. The area of each circumferential row of openings 14 is preferably made approximately equal to twice the area of the piston 1. By satisfying these requirements, the oil filled spaces opposite the tapered faces of the vibrating pistons will act as an annular shaped tapered horn in which the expanding peripheral annular area of the horn is approximately equal to the total vibrating piston area which is enclosed by the diameter of the annular section at which the expanding peripheral area is measured.

An experimental structure built in accordance with the inventive design illustrated in FIG. 2 and having an overall dimension of 8" diameter×27" long has been capable of being driven by 10 kW electrical input pulses and delivered 6 kW of acoustic power in an omnidirectional horizontal beam in the 3.5 kHz region. The total weight of the experimental transducer was approximately 60 lbs.

FIG. 3 illustrates schematically one method of combining the inventive transducer 102 with a tricardioid hydrophone 103 inside a small streamlined fiberglass free-flooding housing 101 to achieve a lightweight long-range sonar surveillance system with a target bearing resolution of 5°. A tricardioid hydrophone 103, as described in my co-pending application and also in U.S. Pat. No. 4,198,705, is also mounted inside the streamlined housing 101 with its axis parallel to the axis of the transducer 102 and spaced a couple of feet from the transducer as illustrated. A tow cable 104 includes the electrical conductors necessary for operating the sonar system. The electronic circuits necessary for operating the system are contained within the waterproof housing 105. Details of the electronics and the wiring connections are not shown as they are not a part of this invention. The invention resides in the novel lightweight transducer design as herein disclosed which operates at high efficiencies above 50% in the mid-audio frequency region between 3 to 4 kHz, more or less, and in the use of the new lightweight high-power transducer in combination with a small tricardioid hydrophone to obtain a new lightweight sonar system which can detect underwater targets at long range in the order of 20,000 meters with a bearing accuracy within 5°. The complete low-frequency high-power sonar transducer/hydrophone system, including its streamlined enclosure weighs less than 200 lbs. and can be towed by small ships or helicopters to permit efficient sonar surveillance of large areas heretofore not feasible with the prior art scanning sonar systems whose size and weight are enormous if they are designed for operation in the mid-audio frequency region.

FIG. 4 illustrates how the sonar system illustrated in FIG. 3 may be towed from a helicopter 106. It is, of course, possible to tow the inventive lightweight sonar system 101 from a small patrol boat or from a submarine if desired. The very light weight of the inventive low-frequency sonar system makes it easily launched and retracted by lightweight mechanisms or by simple hand operated structures.

Although a few specific examples have been given to illustrate the advantages of the disclosed invention, it should be understood that additional modifications and alternative constructions may be made without departing from the true spirit and scope of the invention. Therefore, the appended claims are intended to cover all such equivalent alternative constructions that fall within their true spirit and scope.

I claim:

1. A lightweight transducer assembly for generating high-power underwater sound within the mid-audible frequency region comprising a generally cylindrical structure including a rigid tubular housing having a vertical axis, the sound radiation pattern from said transducer assembly characterized in that it is omnidirectional in the horizontal plane, said transducer assembly including one or more vibratile structures, each vibratile structure comprising a pair of vibratile pistons, each piston having at least one plane surface, said pair of vibratile pistons spaced from one another along said vertical axis and arranged with the plane surface of each piston parallel and facing each other, an electromechanical force generator characterized in that said force generator includes two parallel plane surfaces, each one of said facing plane surfaces of said pair of pistons is bonded to an opposite one of said parallel plane surfaces of said electromechanical force generator, means for mounting said vibratile pistons concentrically within said tubular housing, said tubular housing characterized in that it includes a plurality of openings through its peripheral wall located in axial regions of said tubular housing in the vicinity of the axial locations of said vibratile pistons, electrical terminal means connected to said electromechanical force generator, said electromechanical force generator is characterized in that an alternating mechanical force is generated between said two parallel plane surfaces of said force generator when an alternating electrical signal is applied to said electrical terminal means, and further characterized in that said alternating mechanical force is transferred to said pair of pistons which results in an oscillatory displacement of each of said pistons along said vertical axis of said transducer assembly, said pistons characterized in that the diameter of said pistons is within the approximate range $\frac{1}{4}$ to $\frac{5}{8}$ wavelength of the underwater sound generated by said transducer when operated at the specified mid-audible frequency region, and further characterized in that said pistons are located within said tubular housing with their centers aligned with the vertical axis of said transducer assembly.

2. The invention in claim 1 characterized in that the exposed piston radiating surfaces which are opposite said plane piston surfaces which are bonded to said electrochemical force generator are convex.

3. The invention in claim 2 further characterized in that said convex surfaces are conical.

4. The invention in claim 3 and a sound transparent outer housing surrounding said rigid tubular housing.

5. The invention in claim 4 and a sound transmitting fluid filling the space between the radiating surfaces of said vibratile pistons and the openings in the wall of said rigid tubular housing.

6. The invention described in claim 5 and a multi-element hydrophone assembly having a vertical axis, said hydrophone assembly characterized in that each hydrophone element has a cardioid directional pattern in the horizontal plane over an angle of plus or minus 60° from its axis of maximum sensitivity, and further characterized in that the axis of maximum sensitivity of each hydrophone element in said hydrophone assembly is displaced 120° from its neighbor, means for mounting said transducer assembly and said hydrophone assembly with their vertical axes separated and parallel to one another, first electronic circuit means for supplying audio frequency power to said transducer, second electronic circuit means associated with said multi-element hydrophone, said second electronic circuit means characterized in that it includes means for measuring the relative intensities of the electrical signals generated in each of the separated hydrophone elements contained in the assembly upon the arrival of an underwater sound signal at the hydrophone location, whereby the measured magnitudes of said relative intensities determine the bearing of the received sound signal.

7. The invention in claim 6 and a streamlined sonar dome surrounding said transducer and said hydrophone combination.

8. The invention in claim 7 and means for towing said streamlined sonar dome at submerged water depths.

9. The invention in claim 1 characterized in that the area of each peripheral opening located at each axial region in said housing is made approximately equal to the total projected area of the radiating surface of the vibratile pistons located in the vicinity of the axial position of each peripheral opening.

10. The invention in claim 9 characterized in that the exposed piston radiating surfaces which are opposite said plane piston surfaces which are bonded to said elecromagnetic force generator are convex.

11. The invention in claim 10 further characterized in that said convex surfaces are conical.

12. The invention in claim 11 and a sound transparent outer housing surrounding said rigid tubular housing.

13. The invention in claim 12 and a sound transmitting fluid filling the space between the radiating surfaces of said vibratile pistons and the openings in the wall of said tubular housing.

14. The invention described in claim 13 and a multi-element hydrophone assembly having a vertical axis, said hydrophone assembly characterized in that each hydrophone element has a cardioid directional pattern in the horizontal plane over an angle of plus or minus 60° from its axis of maximum sensitivity, and further characterized in that the axis of maximum sensitivity of each hydrophone element in said hydrophone assembly is displaced 120° from its neighbor, means for mounting said transducer assembly and said hydrophone assembly with their vertical axes separated and parallel to one another, first electronic circuit means for supplying audio frequency power to said transducer, second electronic circuit means associated with said multi-element hydrophone, said second electronic circuit means characterized in that it includes means for measuring the relative intensities of the electrical signals generated in each of the separated hydrophone elements contained in the assembly upon the arrival of an underwater sound signal at the hydrophone location, whereby the measured magnitudes of said relative intensities determine the bearing of the received sound signal.

15. The invention in claim 14 and a streamlined sonar dome surrounding said transducer and said hydrophone combination.

16. The invention in claim 15 and means for towing said streamlined sonar dome at submerged water depths.

17. In combination, the transducer described in claim 1 and a multi-element hydrophone assembly having a vertical axis, said hydrophone assembly characterized in that each hydrophone element has a cardioid directional pattern in the horizontal plane over an angle of plus or minus 60° from its axis of maximum sensitivity and further characterized in that the axis of maximum sensitivity of each hydrophone element in said hydrophone assembly is displaced 120° from its neighbor, means for mounting said transducer assembly and said hydrophone assembly with their vertical axes separated and parallel to one another, first electronic circuit means for supplying audio frequency power to said transducer, second electronic circuit means associated with said multi-element hydrophone, said second electronic circuit means characterized in that it includes means for measuring the relative intensities of the electrical signals generated in each of the separated hydrophone elements contained in the assembly upon the arrival of an underwater sound signal at the hydrophone location, whereby the measured magnitudes of said relative intensities determine the bearing of the received sound signal.

18. The invention in claim 17 and a streamlined sonar dome surrounding said transducer and said hydrophone combination.

19. The invention in claim 18 and means for towing said streamlined sonar dome at submerged water depths.

20. In combination in a lightweight sonar system for operating in the midaudible frequency region and capable of detecting the presence and location of a submerged target at long ranges in the order of 20,000 meters, a transmitting transducer capable of generating underwater acoustic power of several kilowatts in the mid-audible frequency region, said transducer comprising a generally cylindrical structure including a rigid tubular housing having a vertical axis, the sound radiation pattern from said transducer assembly characterized in that it is omnidirectional in the horizontal plane, said transducer assembly including a plurality of vibratile structures, each vibratile structure comprising a pair of vibratile pistons, each piston having at least one plane surface, said pair of vibratile pistons spaced from one another along said vertical axis and arranged with the plane surface of each piston parallel and facing each other, an electromechanical force generator characterized in that said force generator includes two parallel plane surfaces, each one of said facing plane surfaces of said pistons is bonded to an opposite one of said parallel plane surfaces of said electromechanical force generator, means for mounting said vibratile pistons concentrically within said tubular housing, said tubular housing characterized in that it includes a plurality of openings through its peripheral wall located in axial regions of said tubular housing in the vicinity of the axial locations of said vibratile pistons, electrical terminal means connected to said electromechanical force generator, said electromechanical force generator is characterized in that an alternating mechanical force is generated between said two parallel plane surfaces of said force generator when an alternating electrical signal is applied to said electrical terminal means, and further characterized in that said electrochemical force is transferred to said pair of pistons which results in an oscillatory displacement of each of said pistons along said vertical axis of said transducer assembly, said pistons characterized in that the diameter of said pistons is within the approximate range ⅓ to ⅔ wavelength of the underwater sound generated by said transducer when operated at the specified mid-audible frequency region, and further characterized in that said pistons are located within said tubular housing with their centers aligned with the vertical axis of said transducer assembly, and still further characterized in that the exposed piston radiating surfaces which are opposite the faces of said pistons which are bonded to said electromechanical generator are approximately conical, a sound transparent outer housing surrounding said rigid tubular housing, a sound transmitting liquid filling the space between the radiating surfaces of said vibratile pistons and the openings in the wall of said rigid housing, a multi-element hydrophone assembly having a vertical axis, said hydrophone assembly characterized in that each element has a cardioid directional pattern in the horizontal plane over an angle of plus or minus 60° from its axis of maximum sensitivity, and further characterized in that the axis of maximum sensitivity of each hydrophone is displaced 120° from its neighbor, means for mounting said transmitting transducer assembly and said hydrophone assembly in fixed spatial relationship to one another, first electronic circuit means for supplying audio frequency power to said transmitting transducer, second electronic circuit means associated with said multi-element hydrophone said second electronic circuit means characterized in that it includes means for measuring the relative intensities of the electrical signals generated in each of the separated hydrophone elements contained in the assembly upon the arrival of an underwater sound signal at the hydrophone location, whereby the measured magnitudes of said relative intensities determine the bearing of the received sound signal.

21. The invention in claim 20 characterized in that said fixed spatial relationship results in a coaxial alignment of the vertical axes of said transmitting transducer and said multi-element hydrophone assembly.

22. The invention in claim 20 characterized in that said fixed spatial relationship results in the said vertical axes of said transducer and said hydrophone being held separated and parallel to one another.

* * * * *